US012772154B2

(12) United States Patent
Tripathi

(10) Patent No.: US 12,772,154 B2
(45) Date of Patent: Oct. 20, 2026

(54) SYSTEM, METHOD, AND COMPUTER PROGRAM FOR ASSIGNING CELL IDENTIFICATION

(71) Applicant: Rakuten Mobile, Inc., Tokyo (JP)

(72) Inventor: Sandeep Mani Tripathi, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 538 days.

(21) Appl. No.: 18/270,514

(22) PCT Filed: May 30, 2023

(86) PCT No.: PCT/US2023/023837
§ 371 (c)(1),
(2) Date: Jun. 30, 2023

(87) PCT Pub. No.: WO2024/248796
PCT Pub. Date: Dec. 5, 2024

(65) Prior Publication Data
US 2025/0081088 A1 Mar. 6, 2025

(51) Int. Cl.
*H04W 36/00* (2009.01)
*H04L 45/02* (2022.01)
(Continued)

(52) U.S. Cl.
CPC ............ *H04W 48/16* (2013.01); *H04L 45/02* (2013.01); *H04W 48/20* (2013.01)

(58) Field of Classification Search
CPC ....... H04W 24/02; H04W 16/18; H04W 8/26; H04W 76/11; H04W 56/001; H04W 12/10; H04W 24/10; H04W 16/10; H04W 36/00835; H04W 40/24; H04W 36/08; H04W 16/02; H04W 72/0453; H04W 88/08; H04W 88/18; H04W 16/12; H04W 28/0226; H04W 28/20; H04W 36/0005; H04W 36/0088; H04W 36/322; H04W 36/324; H04W 4/027; H04W 48/00; H04W 48/04; H04W 48/08; H04W 56/00; H04W 72/04; H04W 72/50; H04W 72/51; H04W 84/005; H04W 84/047; H04W 84/18;
(Continued)

(56) References Cited

U.S. PATENT DOCUMENTS

2014/0369285 A1* 12/2014 Li .......................... H04W 8/26 370/329
2015/0319624 A1* 11/2015 Garcia ................ H04J 11/0069 370/329
(Continued)

FOREIGN PATENT DOCUMENTS

KR 10-2013-0004656 A 1/2013
KR 20130004656 A * 1/2013 ........... H04W 36/08
WO WO-2011102172 A1 * 8/2011 ............ H04L 61/50

*Primary Examiner* — Quan M Hua
(74) *Attorney, Agent, or Firm* — Sughrue Mion, PLLC

(57) ABSTRACT

Provided are system, method, and device for assigning identification to cells. According to embodiments, the system may include: a memory storage storing computer-executable instructions; and at least one processor communicatively coupled to the memory storage, wherein the at least one processor may be configured to execute the instructions to: determine a distance between a current cell and a plurality of cells; and assign an identification value to the current cell based on at least the distance.

18 Claims, 12 Drawing Sheets

(51) Int. Cl.
*H04W 48/16* (2009.01)
*H04W 48/20* (2009.01)

(58) Field of Classification Search
CPC ... H04W 88/04; H04W 88/085; H04W 92/20; H04W 12/122; H04W 12/61; H04W 12/73
See application file for complete search history.

(56) References Cited

U.S. PATENT DOCUMENTS

| | | | | |
|---|---|---|---|---|
| 2016/0014651 | A1* | 1/2016 | Wellington | H04W 36/00835 455/436 |
| 2017/0086169 | A1* | 3/2017 | Huang | H04W 72/121 |
| 2019/0261198 | A1* | 8/2019 | Sarkar | G06F 9/45558 |

* cited by examiner

Example 1

| PCI | 0 | 1 | 2 | 3 | … | N |
|---|---|---|---|---|---|---|
| Group | 3 | 1 | 2 | 1 | … | 3 |

Example 2

| PCI | 0 | 1 | 2 | 3 | … | N |
|---|---|---|---|---|---|---|
| Group | 2 | 3 | 2 | 3 | … | 3 |

Example 3

| PCI | 0 | 1 | 2 | 3 | … | N |
|---|---|---|---|---|---|---|
| Group | 3 | 3 | 3 | 3 | … | 3 |

FIG. 7

SYSTEM, METHOD, AND COMPUTER PROGRAM FOR ASSIGNING CELL IDENTIFICATION

CROSS REFERENCE TO RELATED APPLICATIONS

This application is a National Stage of International Application No. PCT/US2023/23837 filed May 30, 2023.

TECHNICAL FIELD

Systems, methods, and computer programs consistent with example embodiments of the present disclosure relate to a telecommunication network, and more specifically, relate to assigning identification to cells in a telecommunication network.

BACKGROUND

In a telecommunication network, Physical Cell Identity (PCI) may refer to an identifier of a cell in a network. PCI is an important factor in a telecommunication network, since it allows, among other things, a user equipment (UE) to identify a specific cell that it is communicating with.

In the related art, there is a limited number of PCIs that may be assigned to cells within the network, and thus, some PCIs may be reused when there are more cells in the network than the PCI. Such reuse of PCI may cause an issue where a user equipment (UE) may be within a coverage area of two (or more) cells sharing the same PCI and frequency bands. Subsequently, the UE may not be able to distinguish between the two cells when receiving and transmitting data.

FIG. 1 illustrates a visual example of the above issue related to identifier of a cell in the related art. As shown in FIG. 1, the UE may be within the coverage area of two PCI 54*s*, and may be unable to distinguish between the said PCI 54*s*. Subsequently, the UE may not be able to transmit and receive data from a correct cell, causing issues such as failed handover, interferences, etc.

Several methods for planning of PCI assignments to cells are used in the related art to avoid the above-mentioned issues. However, such methods generally use prediction-based cell overlap and planning, which is slow and inefficient.

SUMMARY

Example embodiments of the present disclosure assign identification to cells based on a distance, overlapping areas, and a number of PCI reuse. As such, example embodiments of the present disclosure provide an efficient and faster PCI assignments to cells in comparison to the related art.

According to embodiments, a system is provided. The system may include: a memory storage storing computer-executable instructions; and at least one processor communicatively coupled to the memory storage, wherein the at least one processor may be configured to execute the instructions to: determine a distance between a current cell and a plurality of cells; and assign an identification value to the current cell based on at least the distance.

According to embodiments, a method is provided. The method may include: determining a distance between a current cell and a plurality of cells; and assigning an identification value to the current cell based on at least the distance.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 7 illustrates examples of grouping of the plurality of cells, according to one or more embodiments.

DETAILED DESCRIPTION

Figure 1:
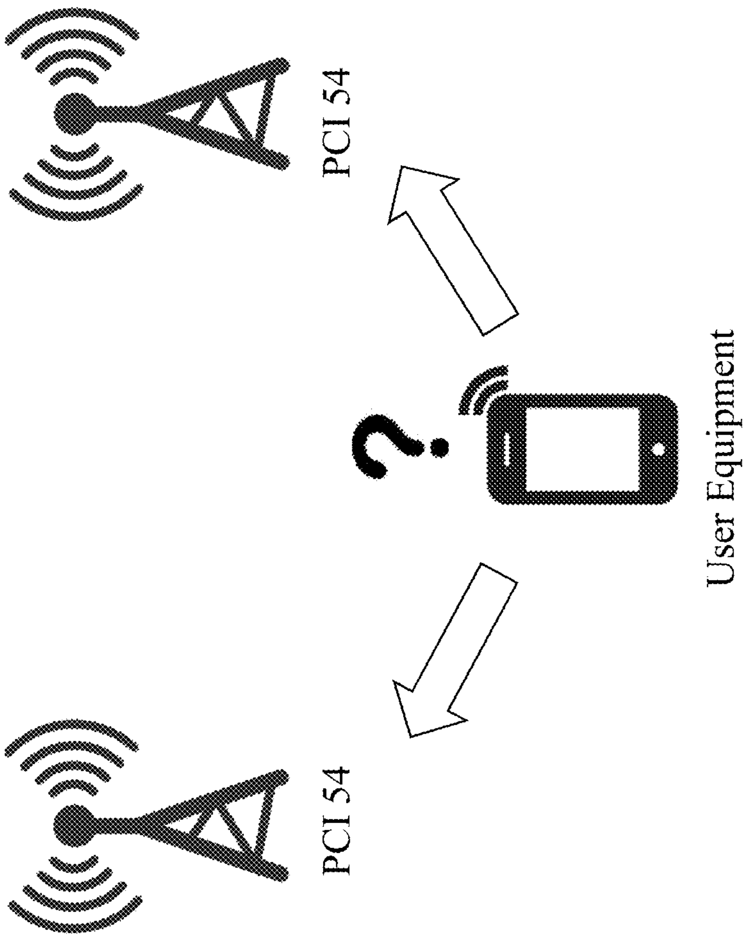
FIG. 1 illustrates a visual example of an issue related to identifier of a cell in the related art.

The following detailed description of example embodiments refers to the accompanying drawings. The same reference numbers in different drawings may identify the same or similar elements.

The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, devices, and the like, provided in the example embodiments of the present disclosure assign identification to cells based on a distance, overlapping areas, and a number of identification reuse.

According to embodiments, the system may determine a distance between a current cell and a plurality of cells within the network; determine an amount of overlap between areas of the current cell and areas of the plurality of cells; determine a number of reuse of a particular identification value of each of the plurality of cells; and assign an identification value to the current cell from one of the plurality of cells based on such determinations. For example, based on determining that a particular cell is the furthest away from the current cell, has the lowest amount of overlap with the current cell, and has the lowest amount of reuse of the identification value, the system may assign the identification value of such particular cell to the current cell.

Ultimately, example embodiments of the present disclosure that assign identification to cells based on a distance, overlapping areas, and a number of identification reuse, provide an efficient and faster identification assignments to cells in comparison to the related art.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the threshold tuning system of the present disclosure, according to one or more embodiments, are provided in the following.

Example System Architecture

Figure 2:
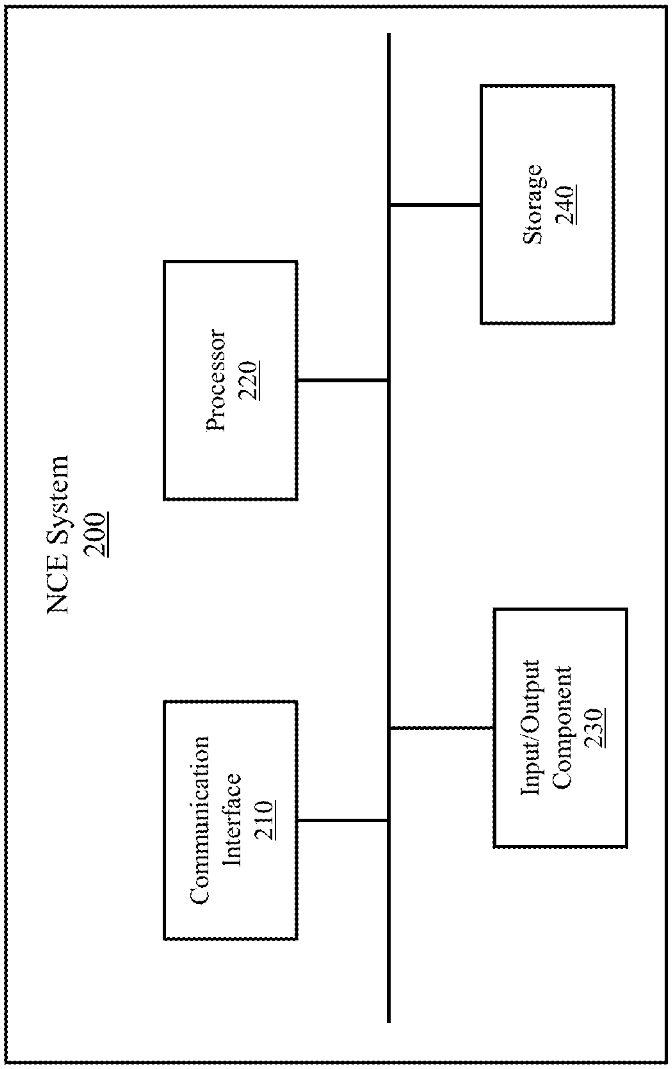
FIG. 2 illustrates a block diagram of example components in a Cell Identification Assignment (CIA) System, according to one or more embodiments.

FIG. 2 illustrates a block diagram of example components of a Cell Identification Assignment (CIA) system 200, according to one or more embodiments. The CIA system 200 may include a system, a platform, a module, or the like, which may be configured to perform one or more operations or actions for assigning identification to cells. Example operations performable by the CIA system 200 for assigning identification to cells are described below with reference to FIG. 3 to FIG. 12.

As illustrated in FIG. 2, the CIA system 200 may include at least one communication interface 210, at least one processor 220, at least one input/output component 230, and at least one storage 240, although it can be understood that the CIA system 200 may include more or less components than as illustrated in FIG. 2, and/or may be arranged in a manner different from as illustrated in FIG. 2, without departing from the scope of the present disclosure.

The communication interface 210 may include at least one transceiver-like component (e.g., a transceiver, a separate receiver and transmitter, a bus, etc.) that enables the components of the CIA system 200 to communicate with each other and/or to communicate with one or more components external to the CIA system 200, such as via a wired connection, a wireless connection, or a combination of wired and wireless connections.

For instance, the communication interface 210 may couple the processor 220 to the storage 240 to thereby enable them to communicate and to interoperate with each other in performing one or more operations.

According to one or more embodiments, the communication interface 210 may include one or more application programming interfaces (APIs) which allow the CIA system 200 (or one or more components included therein) to communicate with one or more software applications.

The input/output component 230 may include at least one component that permits the CIA system 200 to receive information and/or to provide output information. It can be understood that, in some embodiments, the input/output component 230 may include at least one input component (e.g., a touch screen display, a button, a switch, a microphone, a sensor, etc.) and at least one output component (e.g., a display, a speaker, one or more light-emitting diodes (LEDs), etc.), each of which may be separated from each other.

The storage 240 may include one or more storage mediums suitable for storing data, information, and/or computer-executable instructions therein. According to embodiments, the storage 240 may include at least one memory storage, such as a random access memory (RAM), a read only memory (ROM), and/or another type of dynamic or static storage device (e.g., a flash memory, a magnetic memory, and/or an optical memory) that stores information and/or instructions for use by the processor 220. Additionally or alternatively, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 240 may be configured to store information, such as raw data, metadata, or the like. Additionally or alternatively, the storage 240 may be configured to store one or more information associated with one or more operations performed by the processor 220. For instance, the storage 240 may store information defining the historical operation(s) performed by the processor 220 to assign identification to cells, one or more results of operations performed by the processor 220, or the like. Further, the storage 240 may store data or information required in assigning identification to cells. For instance, the storage 240 may store identification values associated with each cell within the network.

In some implementation, the storage 240 may include a plurality of storage mediums, and the storage 240 may be configured to store a duplicate or a copy of at least a portion of the information in the plurality of storage mediums, for providing redundancy and for backing-up the information or the associated data. Furthermore, the storage 240 may also store computer-readable or computer-executable instructions which, when being executed by one or more processors (e.g., processor 220), causes the one or more processors to perform one or more actions/operations described herein.

The processor 220 may include at least one processor capable of being programmed or being configured to perform a function(s) or an operation(s) described herein. For instance, the processor 220 may be configured to execute computer-executable instructions stored in at least one storage medium or a memory storage (e.g., storage 240, etc.) to thereby perform one or more actions or one or more operations described herein.

According to embodiments, the processor 220 may be configured to receive (e.g., via the communication interface 210, via the input/output component 230, etc.) one or more signals and/or one or more user inputs defining one or more instructions for performing one or more operations. Further, the processor 220 may be implemented in hardware, firmware, or a combination of hardware and software. For instance, processor 220 may include at least one of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 220 may be configured to collect, to extract, and/or to receive one or more information (in the form of signal or data, etc.), and to process the received one or more information to thereby assign identification to cells.

Descriptions of several example operations which may be performed by the processor 220 are provided below with reference to FIG. 3 to FIG. 12.

Example Operations for Cell Planning in the Present Disclosure

In the following, several example operations performable by the CIA system of the present disclosure are described with reference to FIG. 3 to FIG. 12.

Figure 3:
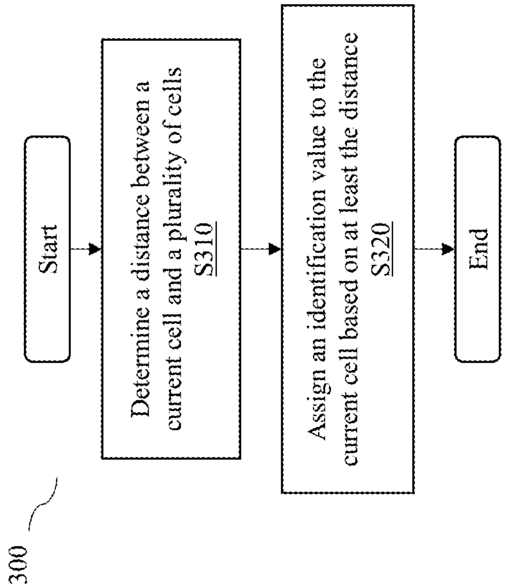
FIG. 3 illustrates a flow diagram of an example method for cell planning, according to one or more embodiments.

FIG. 3 illustrates a flow diagram of an example method 300 for cell planning, according to one or more embodiments. One or more operations in method 300 may be performed by at least one processor (e.g., processor 220) of the CIA system.

As illustrated in FIG. 3, at operation S310, the at least one processor may be configured to determine a distance between a current cell and a plurality of cells within a network. The current cell may refer to a cell which the system is assigning an identification value to. For example, if the network includes the current cell and 5 cells, the at least one processor may be configured to determine a distance between the current cell and each of the 5 cells. The method then proceeds to operation S320.

At operation S320, the at least one processor may be configured to assign the identification value to the current cell based on at least the distance determined at operation S310. According to embodiments, based on the determined distance between the current cell and the plurality of cells, the at least one processor may be configured to assign an identification value of one of the plurality of cells to the current cell. According to embodiments, in response to determining that there is only one cell that is at a distance far away from the current cell, the at least one processor may be configured to assign an identification value of said one far away cell to the current cell. Examples of operations for assigning the identification value to the current cell are described below with reference to FIG. 4.

Upon performing operation S320, the method 300 may be ended or be terminated. Alternatively, method 300 may return to operation S310, such that the at least one processor may be configured to repeatedly perform, for at least a predetermined amount of time, the determining of the distance (at operation S310) and the assigning the identification value (at operation S320).

To this end, the system of the present disclosure may assign identification to a cell based on at least a distance between the cell and a plurality of cells.

It can be understood that the configuration illustrated in FIG. 3 is simplified for descriptive purpose, and is not intended to limit the scope of the present disclosure in any way. Further, the operations for cell planning according to the present disclosure may be employed for a new cell when such new cell is being deployed in the network, or may be employed for a cell that is already deployed in the network but needs to be assigned a new identification value.

Example Operations for Assigning an Identification Value to a Current Cell in the Present Disclosure In the following several example operations performable by the at least one processor for assigning the identification value to the current cell are described with reference to FIG. 4 to FIG. 12.

Figure 4:
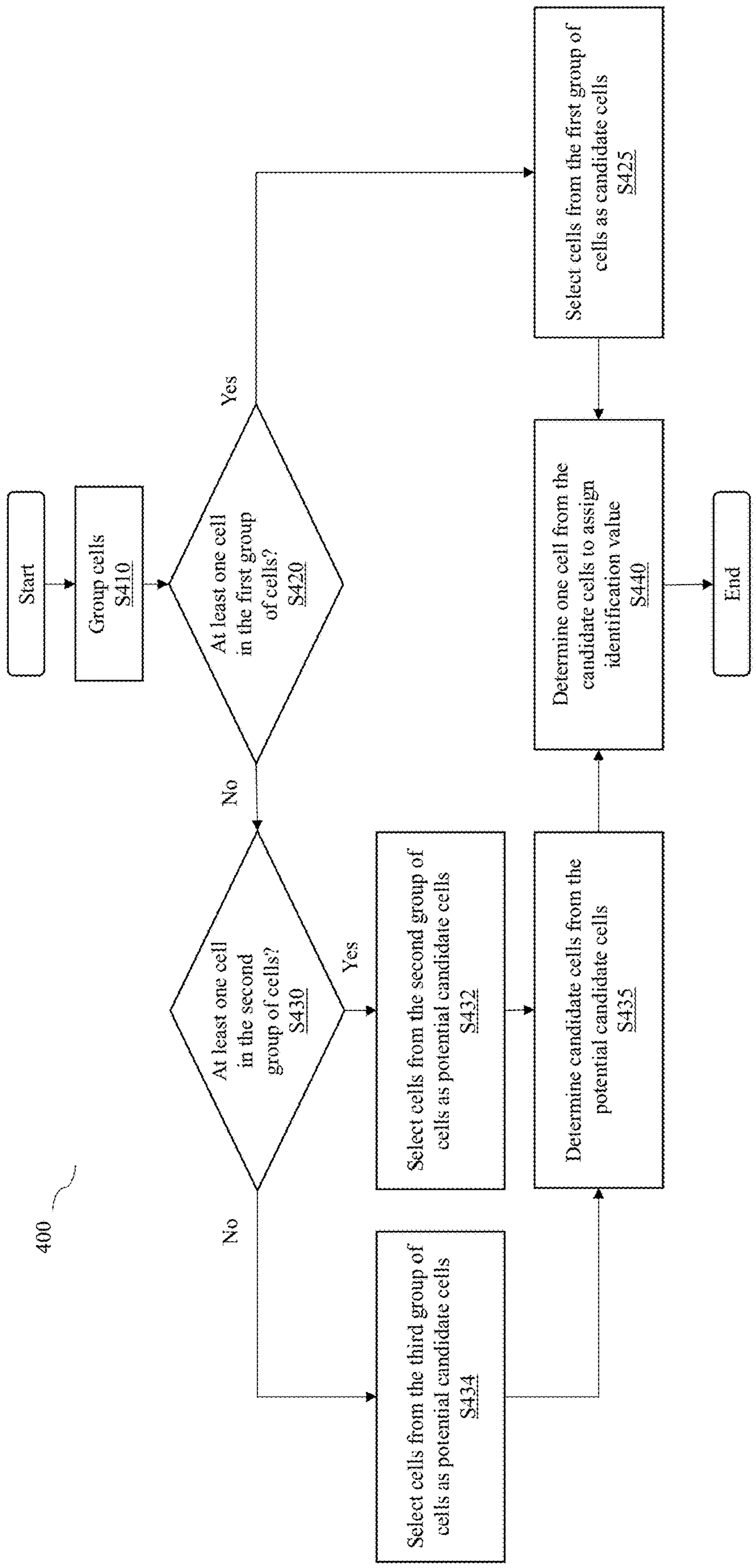
FIG. 4 illustrates a flow diagram of an example method for assigning the identification value, according to one or more embodiments.

FIG. 4 illustrates a flow diagram of an example method 400 for assigning the identification value, according to one or more embodiments. One or more operations of method 400 may be part of operation S320 in method 300, and may be performed by at least one processor (e.g., processor 220) of the CIA system.

As illustrated in FIG. 4, at operation S410, the at least one processor may be configured to group the plurality of cells within the network into three groups. The plurality of cells may be grouped based on the distance between the current cell and the plurality of cells. Examples of operations for grouping the plurality of cells are described below with reference to FIG. 5 to FIG. 7. The method then proceeds to operation S420.

At operation S420, the at least one processor may be configured to determine whether or not there is at least one cell within the first group of cells. The first group of cells may include cells that are far away from the current cell. Example of requirements for cells in the first group of cells, as well as operations for grouping the plurality of cells into the first group of cells are described below with reference to FIG. 5 to FIG. 7.

Accordingly, based on determining that there is at least one cell within the first group of cells, the method proceeds to operation S425. On the other hand, based on determining that there are no cells within the first group of cells, the method proceeds to operation S430.

At operation S425, the at least one processor may be configured to select the cells within the first group of cells as candidate cells, and proceeds to operation S440.

At operation S430, the at least one processor may be configured to determine whether or not there is at least one cell within the second group of cells. The second group of cells may include cells that are at a medium range away from the current cell between the first group of cells and the third group of cells. Example of requirements for cells in the second group of cells and the third group of cells, as well as operations for grouping the plurality of cells into the second group of cells and the third group of cells are described below with reference to FIG. 5 to FIG. 7.

Accordingly, based on determining that there is at least one cell within the second group of cells, the method proceeds to operation S432. On the other hand, based on determining that there are no cells within the second group of cells, the method proceeds to operation S434.

At operation S432, the at least one processor may be configured to select the cells within the second group of cells as potential candidate cells, and proceeds to operation S435. Similarly, at operation S434, the at least one processor may be configured to select the cells within the third group of cells as potential candidate cells, and proceeds to operation S435.

At operation S435, the at least one processor may be configured to determine candidate cells from the potential candidate cells. Examples of operations for determining candidate cells from the potential candidate cells are described below with reference to FIG. 8 to FIG. 10. The method then proceeds to operation S440.

At operation S440, the at least one processor may be configured to determine one cell from the candidate cell to assign an identification value from. According to embodiments, the at least one processor may be configured to determine one cell from the candidate cell that is the most suitable for identification value assignment, and then assign the identification value of the determined one cell as the identification value of the current cell. Example of operations for determine one cell from the candidate cell to assign identification value are described below with reference to FIG. 11 to FIG. 12.

It may be understood that the identification value of the plurality of cells may be predetermined or preconfigured by one or more users (e.g., user(s) from a network operator, etc.).

Example Operations for Grouping the Plurality of Cells in the Present Disclosure In the following several example operations performable by the at least one processor for grouping the plurality of cells are described with reference to FIG. 5 to FIG. 7.

Figure 5:
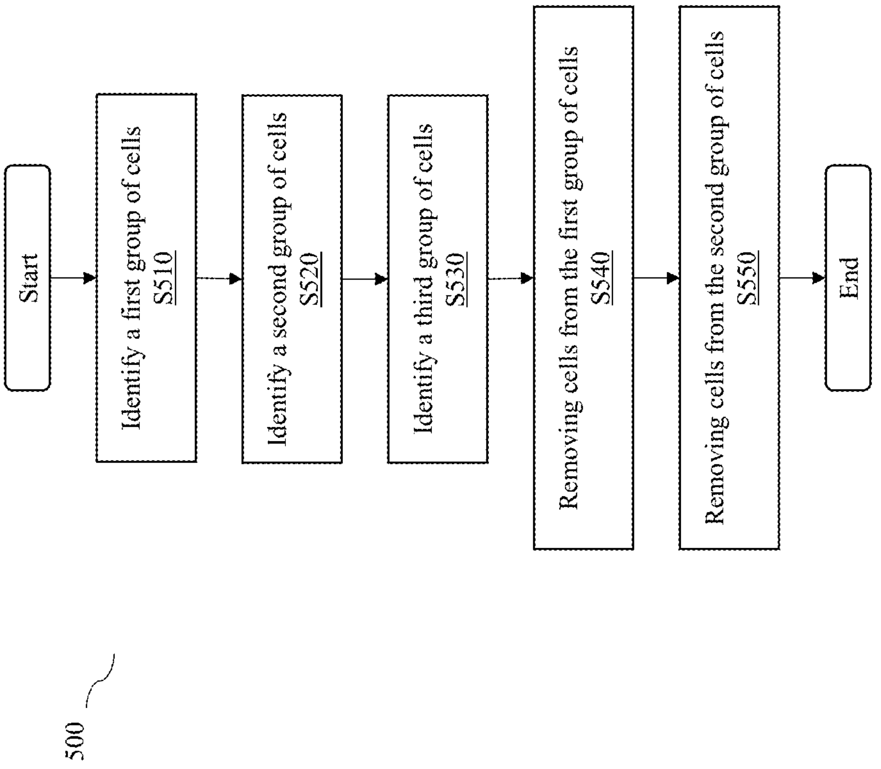
FIG. 5 illustrates a flow diagram of an example method for grouping the plurality of cells, according to one or more embodiments.

FIG. 5 illustrates a flow diagram of an example method 500 for grouping the plurality of cells, according to one or more embodiments. One or more operations of method 500 may be part of operation S410 in method 400, and may be performed by at least one processor (e.g., processor 220) of the CIA system.

As illustrated in FIG. 5, at operation S510, the at least one processor may be configured to identify a first group of cells within the plurality of cells. The first group of cells may be identified based on the distance between the current cell and the plurality of cells.

According to embodiments, the current cell may define a first distance away from the current cell, which in turns define a first radius around the current cell. The first distance may be a double of a search radius of the current cell. As such, the first group of cells may be identified by identifying cells that are at a distance away from the current cell that is greater than the first distance (i.e., cells that are outside of the first radius).

Figure 6:
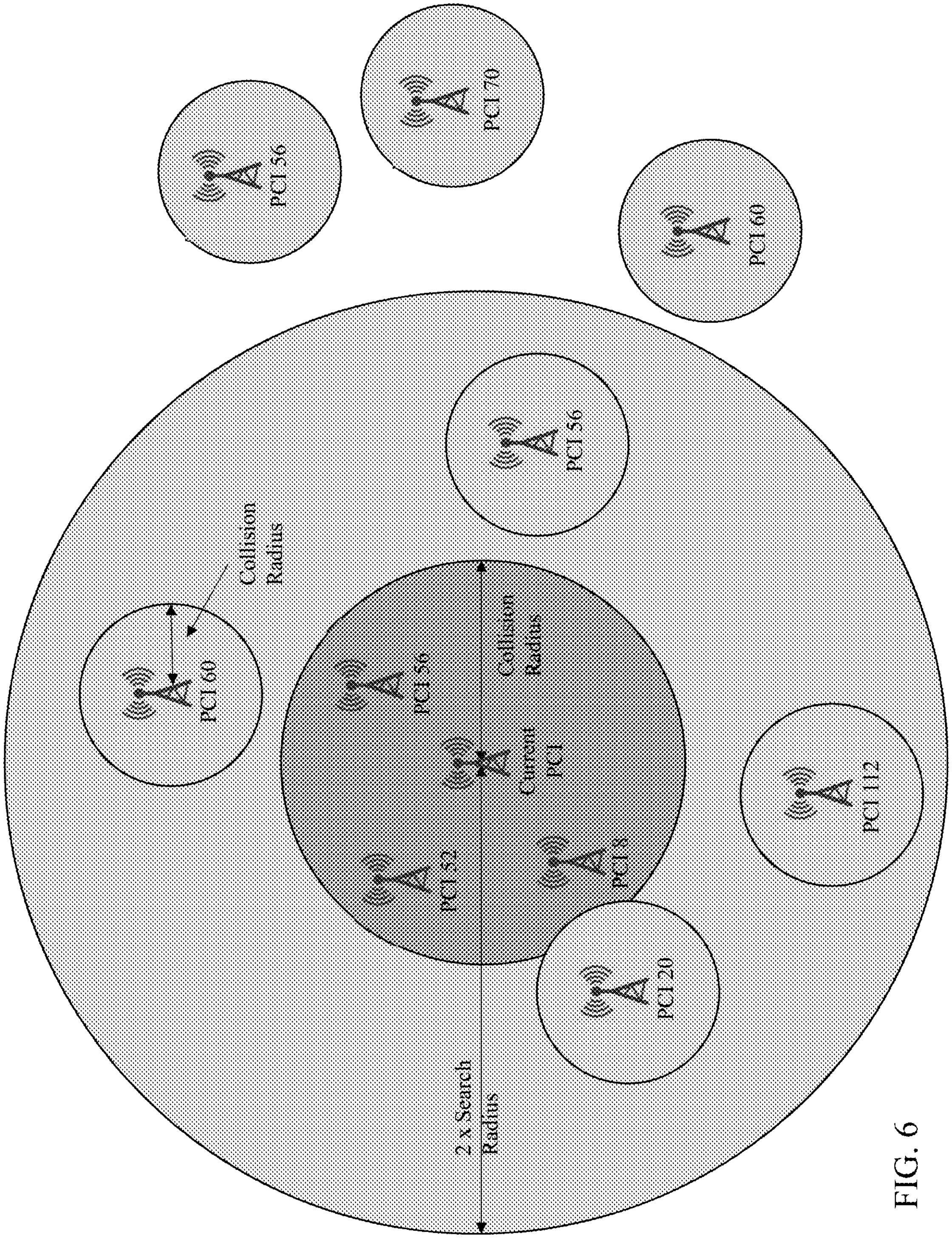
FIG. 6 illustrates a visual example of cells within the network, according to one or more embodiments.

For example, referring now to FIG. 6, which illustrates a visual example of cells within the network, according to one or more embodiments. As seen in FIG. 6, the current cell defines a radius (first radius) that is defined by a distance (first distance) of a double of a search radius of the current cell. As also seen in FIG. 6, one of PCI 56, PCI 70, and one of PCI 60 are outside of such radius, and thus, one of PCI 56, PCI 70, and one of PCI 60 may be identified as the first group of cells. The method then proceeds to operation S520.

Returning to FIG. 5, at operation S520, the at least one processor may be configured to identify a second group of cells within the plurality of cells. The second group of cells may be identified based on the distance between the current cell and the plurality of cells and an overlap between an area defined by the collision radii.

According to embodiments, the current cell may define a second distance away from the current cell, which in turns may define a second radius around the current cell. The second distance may be a collision radius of the current cell. Similarly, each of the plurality of cells may also define a third distance away from a corresponding cell, which in turns may define a third radius around a corresponding cell. The third distance may be a collision radius of the plurality of cells. As such, the second group of cells may be identified by identifying cells that are at a distance away from the current cell that is less than the first distance (i.e., cells that are inside of the first radius), and that is greater than a combination of the second distance and the third distance (cells that do not have any overlap between an area defined by the collision radii).

For example, referring again to FIG. 6, the current cell defines a radius (second radius) that is defined by a distance (second distance) of a collision radius of the current cell. As also seen in FIG. 6, one of PCI 56, PCI 112, PCI 20, and one of PCI 60 are inside of the first radius, but the area defined by the third radius of PCI 20 is overlapping with the area defined by the second radius of the current PCI. Thus, one of PCI 56, PCI 112, and one of PCI 60 may be identified as the second group of cells. The method then proceeds to operation S530.

Returning to FIG. 5, at operation S530, the at least one processor may be configured to identify a third group of cells within the plurality of cells. The third group of cells may be identified based on the distance between the current cell and the plurality of cells and the overlap between an area defined by the collision radii.

The third group of cells may be identified by identifying cells that are at a distance away from the current cell that is less than the first distance (i.e., cells that are inside of the first radius), and that is less than a combination of the second distance and the third distance (cells that have an overlap between an area defined by the collision radii).

For example, referring again to FIG. 6, one of PCI 56, PCI 8, PCI 20, and PCI 52 are inside of the first radius, as well as having their corresponding area defined by the third radius overlapped with the area defined by the second radius of the current PCI. For clarity purpose, since the one of PCI 56, PCI 8, and PCI 52 are inside of the second radius of the current PCI, it can be understood that their corresponding area defined by the third radius are overlapped with the area defined by the second radius of the current PCI, and thus, the area defined by the third radius of one of PCI 56, PCI 8, and PCI 52 are not illustrated in FIG. 6. Thus, one of PCI 56, PCI 8, PCI 20, and PCI 52 may be identified as the third group of cells. The method then proceeds to operation S540.

Returning to FIG. 5, at operation S540, the at least one processor may be configured to remove duplicated cells from the first group of cells. The removed cells may refer to cells that have an identification value that is a same as an identification value of a cell within the second group of cells or the third group of cells. The method then proceeds to operation S550.

At operation S550, the at least one processor may be configured to remove duplicated cells from the second group of cells. The removed cells may refer to cells that have an identification value that is a same as an identification value of a cell within the third group of cells.

For example, referring again to FIG. 6, since PCI 56 is in the third group of cells, PCI 56 is removed from the first group of cells and the second group of cells. Similarly, since PCI 60 is in the second group of cells, PCI 60 is removed from the first group of cells.

It can be understood that operations S540 and S550 are performed to avoid unintentionally assigning an identification value of a cell from a further group (first and second group of cells) to the current cell, when the same identification value is already being used by a cell in a closer group (second and third group of cells).

Referring now to FIG. 7, which illustrates three examples of grouping of the plurality of cells, according to one or more embodiments. As shown in Example 1 to Example 3, the at least one processor may group PCI 0 to PCI N into the first, second, and third groups according to method 500.

Accordingly, in Example 1, the at least one processor may determine that there is at least one cell in the first group of cells (PCI 1 and PCI 3) and then select said cells as candidate cells, at operation S420 and S425 in method 400. Similarly, in Example 2, the at least one processor may determine that there are no cells in the first group of cells and there is at least one cell in the second group of cells (PCI 0 and PCI 2) and then select said cells as potential candidate cells, at operation S430 and S432 in method 400. Similarly, in Example 3, the at least one processor may determine that there are no cells in the first group of cells or the second group of cells, and then select cells from the third group of cells as potential candidate cells, at operation S430 and S434 in method 400.

It can be understood that the configuration illustrated in FIG. 6 and FIG. 7 are provided as an example for descriptive purpose, and is not intended to limit the scope of the present disclosure in any way. Specifically, in practice, the number of cells in the network may be any number, the identification value for each cell may be any value, the location of each cell relative to the current cell may be any location, etc.

Example Operations for Determining Candidate Cells from the Potential Candidate Cells in the Present Disclosure In the following several example operations performable by the at least one processor for determining candidate cells from the potential candidate cells are described with reference to FIG. 8 to FIG. 10.

According to embodiments, the current cell may define a first area extending in a direction away from the current cell, and a second area surrounding the current cell in a radius. When cells within the second group of cells are selected as potential candidate cells, the first area may be a portion of an area defined by the search radius of the current cell, and the second area may be an area defined by the collision radius of the current cell. When cells within the third group of cells are selected as potential candidate cells, the first area may be a portion of an area defined by the collision radius of the current cell, and the second area may be an area defined by a half of the collision radius of the current cell.

Similarly, each cell of the potential candidate cells may define a third area surrounding a corresponding cell in a radius, and a fourth area extending in a direction away from a corresponding cell. When cells within the second group of cells are selected as potential candidate cells, the third area may be an area defined by the collision radius of a corresponding cell of the potential candidate cells, and the fourth area may be a portion of an area defined by a search radius of a corresponding cell of the potential candidate cells. When cells within the third group of cells are selected as potential candidate cells, the third area may be an area defined by a half of the collision radius of a corresponding cell of the potential candidate cells, and the fourth area may be a portion of an area defined by the collision radius of a corresponding cell of the potential candidate cells.

Figure 8:
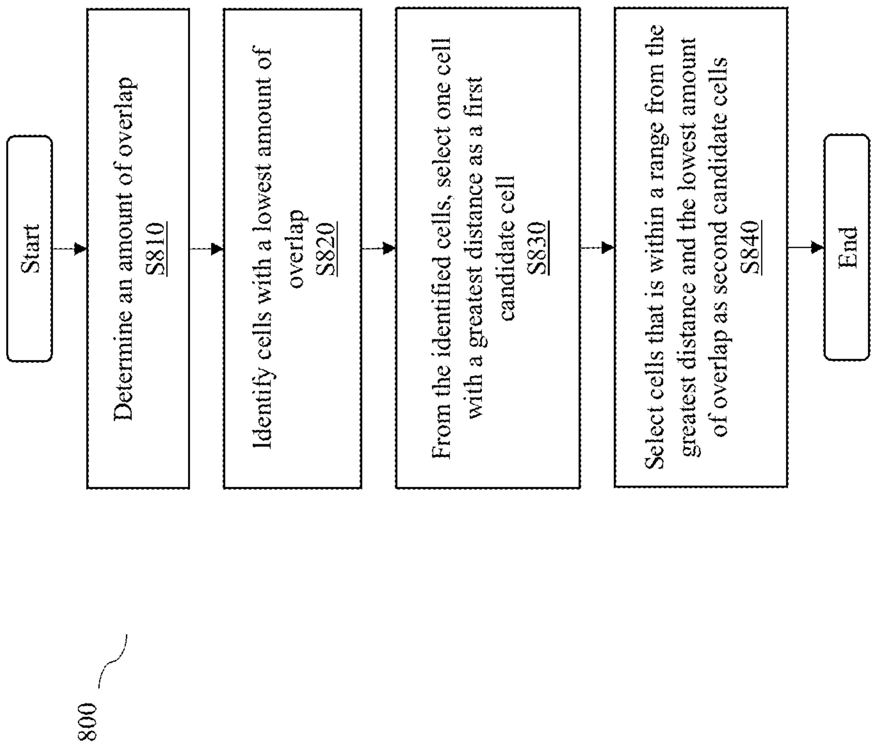
FIG. 8 illustrates a flow diagram of an example method for determining candidate cells from the potential candidate cells, according to one or more embodiments.

FIG. 8 illustrates a flow diagram of an example method 800 for determining candidate cells from the potential candidate cells, according to one or more embodiments. One or more operations of method 800 may be part of operation S435 in method 400, and may be performed by at least one processor (e.g., processor 220) of the CIA system.

As illustrated in FIG. 8, at operation S810, the at least one processor may be configured to determine, for each cell of the potential candidate cells, an amount overlap between the first and second areas of the current cell and the third and fourth areas of a corresponding cell of the potential candidate cells.

Figure 9:
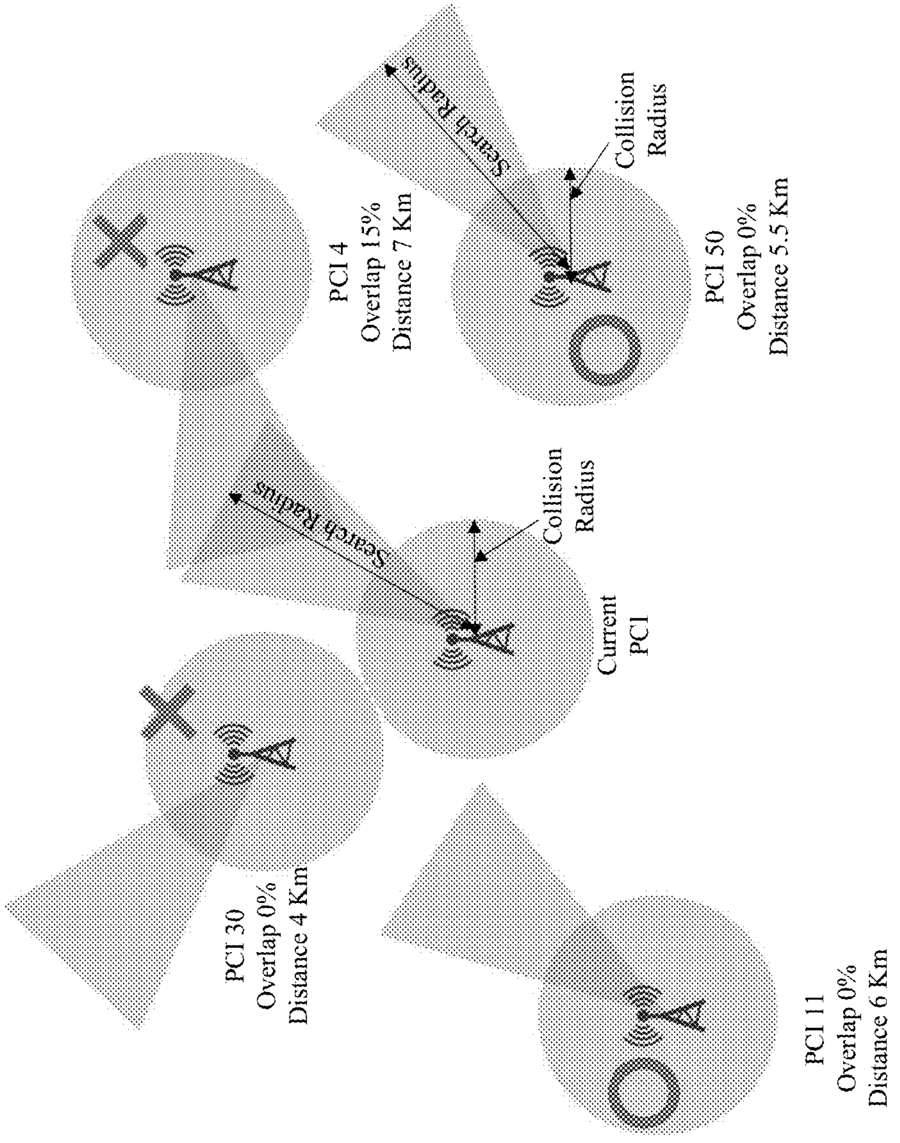
FIG. 9 illustrates a visual example of overlapping between cells in the network when cells within the second group of cells are selected as potential candidate cells, according to one or more embodiments.

For example, referring now to FIG. 9, which illustrates a visual example of overlapping between cells in the network when cells within the second group of cells are selected as potential candidate cells, according to one or more embodiments. As seen in FIG. 9, the current cell may define a first area, which may be a portion of an area defined by the search radius of the current cell extending in a direction away from the current cell, and a second area, which may be an area defined by the collision radius of the current cell surrounding the current cell in a radius. Similarly, each cell of the potential candidate cells (PCI 4, PCI 11, PCI 30, and PCI 50) may define a third area, which may be an area defined by the collision radius surrounding a corresponding cell in a radius, and a fourth area, which may be a portion of an area defined by a search radius extending in a direction away from a corresponding cell.

Accordingly, the at least one processor may determine that the amount of overlap for PCI 11, PCI 30, and PCI 50 are zero, since the first and second areas of the current cell do not have any overlap with the third and fourth areas of PCI 11, PCI 30, and PCI 50. On the other hand, the at least one processor may determine that the amount of overlap for PCI 4 is 15%, since part of the first area of the current cell is overlapping with the fourth area of PCI 4.

Figure 10:
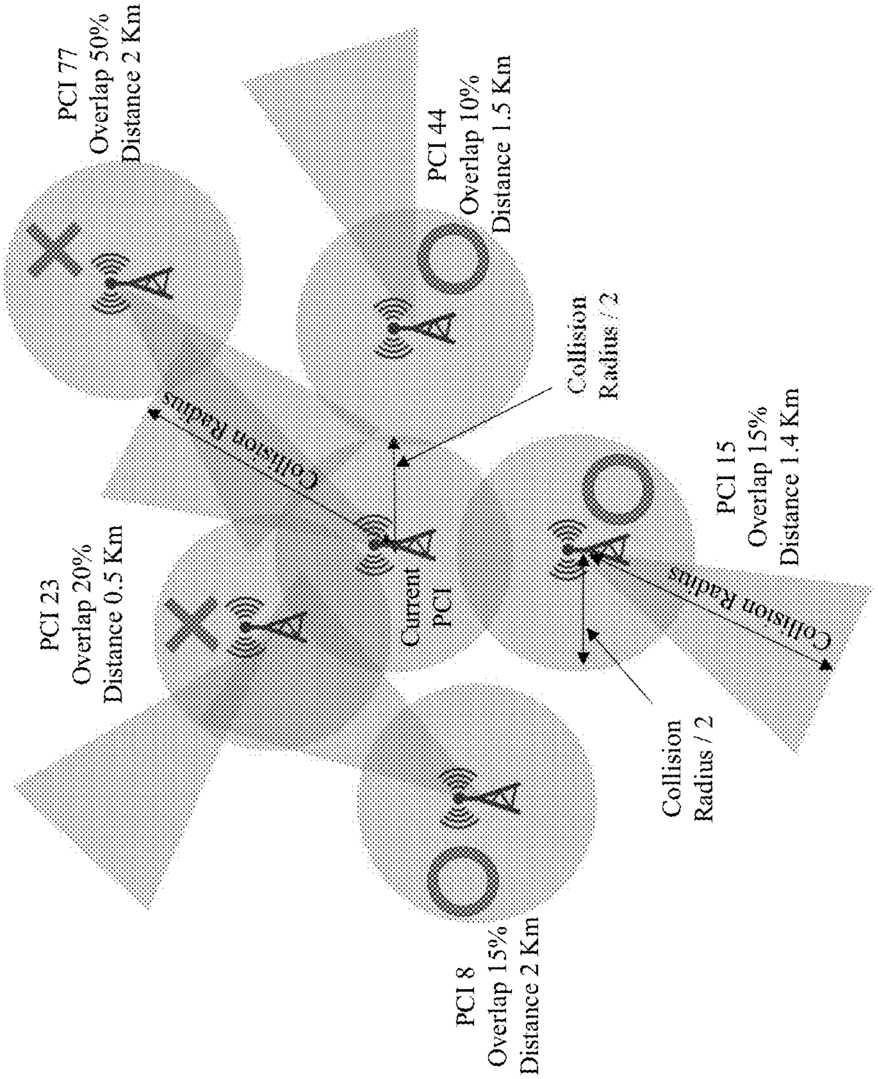
FIG. 10 illustrates a visual example of overlapping between cells in the network when cells within the third group of cells are selected as potential candidate cells, according to one or more embodiments.

As another example, referring now to FIG. 10, which illustrates a visual example of overlapping between cells in the network when cells within the third group of cells are selected as potential candidate cells, according to one or more embodiments. As seen in FIG. 10, the current cell may define a first area, which may be a portion of an area defined by the collision radius of the current cell extending in a direction away from the current cell, and a second area, which may be an area defined by a half of the collision radius of the current cell surrounding the current cell in a radius. Similarly, each cell of the potential candidate cells (PCI 8, PCI 15, PCI 23, PCI 44, and PCI 77) may define a third area, which may be an area defined by a half of the collision radius surrounding a corresponding cell in a radius, and a fourth area, which may be a portion of an area defined by the collision radius extending in a direction away from a corresponding cell.

Accordingly, the at least one processor may determine that the amount of overlap between the first and second areas of the current cell and the third and fourth areas of PCI 8 is 15%, the amount of overlap between the first and second areas of the current cell and the third and fourth areas of PCI 15 is 15%, the amount of overlap between the first and second areas of the current cell and the third and fourth areas of PCI 23 is 20%, the amount of overlap between the first and second areas of the current cell and the third and fourth areas of PCI 44 is 10%, and the amount of overlap between the first and second areas of the current cell and the third and fourth areas of PCI 77 is 50%. The method then proceeds to operation S820.

Returning to FIG. 8, at operation S820, the at least one processor may be configured to identify cells within the potential candidate cells that has a lowest amount of overlap.

For example, referring again to FIG. 9, the at least one processor may be configured to identify PCI 11, PCI 30, and PCI 50 as cells that has a lowest amount of overlap (0%). As another example, referring again to FIG. 10, the at least one processor may be configured to identify PCI 44 as the cell that has a lowest amount of overlap (10%). The method then proceeds to operation S830. It may be understood that if there is only one cell, the at least one processor may be configured to identify such one cell as the cell with a lowest amount of overlap.

Returning to FIG. 8, at operation S830, the at least one processor may be configured to select one cell from within the cells identified at operation S820 that has a greatest distance from the current cell as a first candidate cell.

For example, referring again to FIG. 9, the at least one processor may be configured to select PCI 11 as the first candidate, since PCI 11 has the greatest distance from the current cell in comparison to PCI 30 and PCI 50 (6 Km). As another example, referring again to FIG. 10, the at least one processor may be configured to select PCI 44 as the first candidate, since PCI 44 is the only cell identified at operation S820 and thus, has the greatest distance from the current cell. The method then proceeds to operation S840.

Returning to FIG. 8, at operation S840, the at least one processor may be configured to select cells from within the potential candidate cells that has a distance from the current cell that is within a first range from the greatest distance (distance identified at operation S830/distance of the first candidate cell) and that has an amount of overlap that is within a second range from the lowest amount of overlap (amount of overlap identified at operation S820/amount of overlap of the first candidate cell) as second candidate cells. It may be understood that the first and the second range may be any predetermined or preconfigured by one or more users (e.g., user(s) from a network operator, etc.), and can be values, such as 5%, 10%, 15%, etc.

For example, the at least one processor may select cells from within the potential candidate cells that has a distance from the current cell that is within 10% from the greatest distance and that has an amount of overlap that is within 5% from the lowest amount of overlap.

As such, referring again to FIG. 9, since the greatest distance and the lowest amount of overlap (the distance and amount of overlap of PCI 11 selected at operation S830) is 6 Km and 0%, the at least one processor may select cells from within the potential candidate cells that has a distance from the current cell of at least 5.4 Km and that has an amount of overlap that is at least 5%. Accordingly, the at least one processor may select PCI 50 as the second candidate cell, since PCI 50 has a distance from the current cell of at least 5.4 Km (5.5 Km) and that has an amount of overlap that is at least 5% (0%). On the other hand, since PCI 30 has a distance from the current cell of less than 5.4 Km (4 Km) and PCI 4 has an amount of overlap that is more than 5% (15%), said cells are not selected as second candidate cells.

Similarly, referring again to FIG. 10, since the greatest distance and the lowest amount of overlap (the distance and amount of overlap of PCI 44 selected at operation S830) is 1.5 Km and 10%, the at least one processor may select cells from within the potential candidate cells that has a distance from the current cell of at least 1.35 Km and that has an amount of overlap that is at least 15%. Accordingly, the at least one processor may select PCI 8 and PCI 15 as the second candidate cells, since PCI 8 and PCI 15 have distances from the current cell of at least 1.35 Km (2 Km and 1.4 Km) and that have amount of overlap that are at least 15% (15% and 15%). On the other hand, since PCI 23 has a distance from the current cell of less than 5.4 Km (0.5 Km) and an amount of overlap that is more than 15% (20%) and PCI 77 has an amount of overlap that is more than 15% (50%), said cells are not selected as second candidate cells.

It can be understood that the configuration illustrated in FIG. 9 and FIG. 10 are provided as an example for descriptive purpose, and is not intended to limit the scope of the present disclosure in any way. Specifically, in practice, the number of cells in the network may be any number, the identification value for each cell may be any value, the location of each cell relative to the current cell may be any location, the amount of overlap of each cell relative to the current cell may be any amount, etc.

Example Operations for Determining One Cell from the Candidate Cells to Assign Identification Value in the Present Disclosure In the following several example operations performable by the at least one processor for determining one cell from the candidate cells to assign identification value are described with reference to FIG. 11 to FIG. 12.

According to the embodiments, the candidate cells herein below may refer to the cells selected from the first group of cells at operation S425 in method 400, or may refer to the cells determined from the potential candidate cells at operation S435 in method 400 (i.e., the first candidate cell and second candidate cells selected at operations S830 and S840 in method 800).

Figure 11:
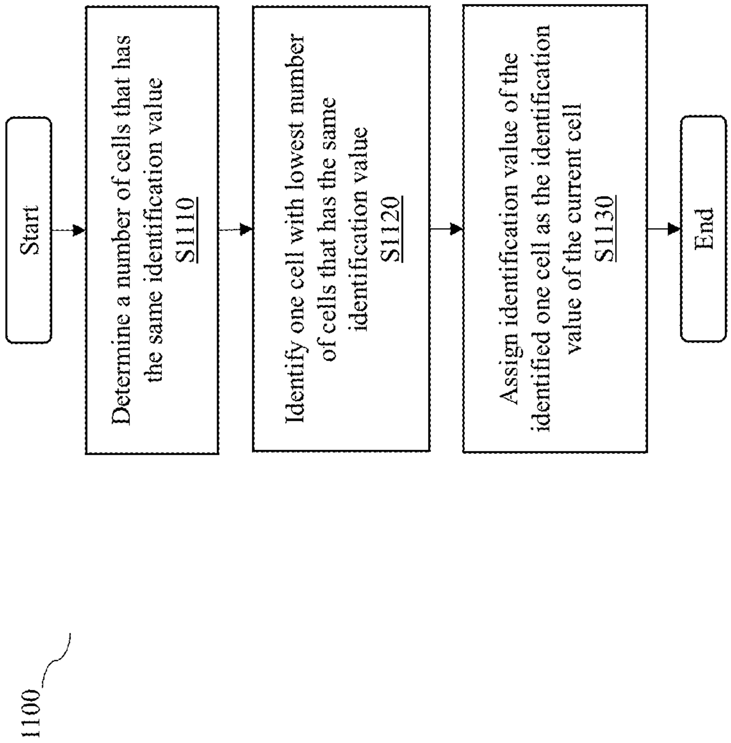
FIG. 11 illustrates a flow diagram of an example method for determining one cell from the candidate cells to assign identification value, according to one or more embodiments.

FIG. 11 illustrates a flow diagram of an example method 1100 for determining one cell from the candidate cells to assign identification value, according to one or more embodiments. One or more operations of method 1100 may be part of operation S440 in method 400, and may be performed by at least one processor (e.g., processor 220) of the CIA system.

As illustrated in FIG. 11, at operation S1110, the at least one processor may be configured to determine, for each cell of the candidate cells, a number of reuse of an identification value. The number of reuse may refer to a number of cells within the plurality of cells that have a same identification value as a corresponding cell of the candidate cells.

Figure 12:
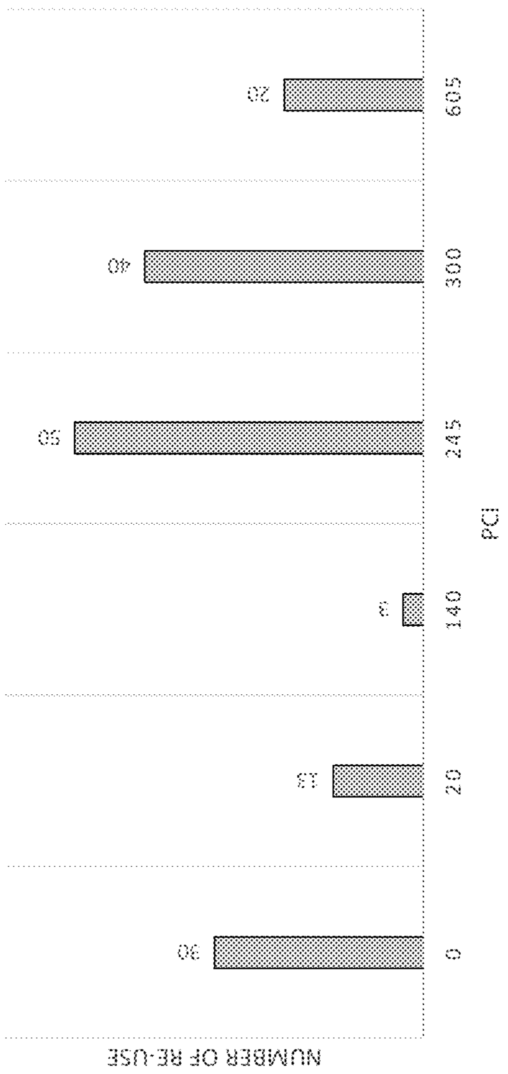
FIG. 12 illustrates a visual example of reuse of an identification value, according to one or more embodiments.

For example, referring now to FIG. 12, which illustrates a visual example of reuse of an identification value, according to one or more embodiments. As seen in FIG. 12, the number of reuse of PCI 0 is 30 (i.e., there are 30 cells in the network that has PCI 0 as the identification value), the number of reuse of PCI 20 is 13, the number of reuse of PCI 140 is 3, the number of reuse of PCI 245 is 50, the number of reuse of PCI 300 is 40, and the number of reuse of PCI 605 is 20. The method then proceeds to operation S1120.

Returning to FIG. 11, at operation S1120, the at least one processor may be configured to identify one of the candidate cells that has a lowest number of reuse. The lowest number of reuse may refer to a lowest number of cells within the plurality of cells that have the same identification value.

For example, referring again to FIG. 12, the at least one processor may be configured to identify that PCI 140 has a lowest number of reuse (3). The method then proceeds to operation S1130.

Returning to FIG. 11, at operation S1130, the at least one processor may be configured to assign an identification value of the one candidate cell identified at operation S1120 as the identification value of the current cell.

For example, referring again to FIG. 12, the at least one processor may be configured to assign PCI 140 as the identification value of the current cell.

It can be understood that the configuration illustrated in FIG. 12 are provided as an example for descriptive purpose, and is not intended to limit the scope of the present disclosure in any way. Specifically, in practice, the number of candidate cells may be any number, the identification value for each cell may be any value, the number of reuse may be any number, etc. Further, it may be understood that if there is only one candidate cell, the at least one processor may be configured to assign the identification value of such one candidate cell as the identification value of the current cell, since such one candidate cell would have the lowest number of reuse.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system that may include: a memory storage storing computer-executable instructions; and at least one processor communicatively coupled to the memory storage, wherein the at least one processor may be configured to execute the instructions to: determine a distance between a current cell and a plurality of cells; and assign an identification value to the current cell based on at least the distance.

Item [2]: The system according to item [1], wherein the at least one processor may be configured to execute the instructions to group the plurality of cells into a plurality of groups based on the distance.

Item [3]: The system according to item [1], wherein the at least one processor may be configured to execute the instructions to assign the identification value by: determining, for each cell of the plurality of cells, a number of cells within the plurality of cells that have a same identification value as a corresponding cell; and assigning the identification value to the current cell based on at least the distance and the number of cells within the plurality of cells that have the same identification value.

Item [4]: The system according to item [3], wherein: the current cell and each cell of the plurality of cells may define a plurality of areas; and the at least one processor may be configured to execute the instructions to assign the identification value by: determining, for each cell of the plurality of cells, an amount of overlap between the plurality of areas of a corresponding cell of the plurality of cells and the plurality of areas of the current cell; and assigning the identification value to the current cell based on the distance, the number of cells within the plurality of cells that have the same identification value, and the amount of overlap.

Item [5]: The system according to any one of items [1] to [4], wherein the current cell may define a first distance away from the current cell, and a second distance away from the current cell, wherein the first distance may be greater than the second distance; each cell of the plurality of cells may define a third distance away from a corresponding cell; and the at least one processor may be configured to execute the instructions to: identify a first group of cells within the plurality of cells, wherein the first group of cells may include cells that are at a distance away from the current cell that is greater than the first distance; identify a second group of cells within the plurality of cells, wherein the second group of cells may include cells that are at a distance away from the current cell that is less than the first distance and that is greater than a combination of the second distance and the third distance; identify a third group of cells within the plurality of cells, wherein the third group of cells may include cells that are at a distance away from the current cell that is less than the first distance and that is less than the combination of the second distance and the third distance; remove cells from the first group of cells, wherein the removed cells from the first group of cells may have an identification value that is a same as an identification value of a cell within the second group of cells or the third group of cells; and remove cells from the second group of cells, wherein the removed cells from the second group of cells may have an identification value that is a same as an identification value of a cell within the third group of cells.

Item [6]: The system according to item [5], wherein the at least one processor may be configured to execute the instructions to assign the identification value by: in response to determining that a number of cells within the first group of cells is at least one, selecting cells within the first group of cells as candidate cells; determining, for each cell of the candidate cells, a number of cells within the plurality of cells that have a same identification value as a corresponding cell of the candidate cells; identifying one of the candidate cells that has a lowest number of cells within the plurality of cells that have the same identification value; and assigning an identification value of the identified one of the candidate cells as the identification value of the current cell.

Item [7]: The system according to item [5], wherein the at least one processor may be configured to execute the instructions to: in response to determining that a number of cells within the first group of cells is zero and a number of cells within the second group of cells is at least one, select cells within the second group of cells as potential candidate cells; and in response to determining that that the number of cells within the first group of cells and the number of cells within the second group of cells are zero, select cells within the third group of cells as the potential candidate cells.

Item [8]: The system according to item [7], wherein: the current cell may define a first area extending in a direction away from the current cell, and a second area surrounding the current cell in a radius; each cell of the potential candidate cells may define a third area surrounding a corresponding cell in a radius, and a fourth area extending in a direction away from a corresponding cell; and the at least one processor may be configured to execute the instructions to: determine, for each cell of the potential candidate cells, an amount overlap between the first and second areas and the third and fourth areas; identify cells within the potential candidate cells that has a lowest amount of overlap; select one cell within the identified cells that has a greatest distance from the current cell as a first candidate cell; and select cells within the potential candidate cells that has a distance from the current cell that is within a first range from the greatest distance and that has an amount of overlap that is within a second range from the lowest amount of overlap as second candidate cells.

Item [9]: The system according to item [8], wherein the at least one processor may be configured to execute the instructions to assign the identification value by: determining, for each cell of the first candidate cell and the second candidate cells, a number of cells within the plurality of cells that have a same identification value as a corresponding cell of the first candidate cell and the second candidate cells; identifying one of the first candidate cell and the second candidate cells that has a lowest number of cells within the plurality of cells that have the same identification value; and assigning an identification value of the identified one of the first candidate cell and the second candidate cells as the identification value of the current cell.

Item [10]: The system according to item [9], wherein: the identification value may include a Physical Cell Identity (PCI); the first distance may define a double of a search radius of the current cell, the second distance may define a collision radius of the current cell, and the third distance may define a collision radius of a corresponding cell of the plurality of cells; when cells within the second group of cells are selected as potential candidate cells: the first area may include a portion of an area defined by the search radius of the current cell, the second area may include an area defined by the collision radius of the current cell, the third area may include an area defined by the collision radius of a corresponding cell of the potential candidate cells; and the fourth area may include a portion of an area defined by a search radius of a corresponding cell of the potential candidate cells; and when cells within the third group of cells are selected as potential candidate cells: the first area may include a portion of an area defined by the collision radius of the current cell, the second area may include an area defined by a half of the collision radius of the current cell, the third area may include an area defined by a half of the collision radius of a corresponding cell of the potential candidate cells; and the fourth area may include a portion of an area defined by the collision radius of a corresponding cell of the potential candidate cells.

Item [11]: A method that may include: determining a distance between a current cell and a plurality of cells; and assigning an identification value to the current cell based on at least the distance.

Item [12]: The method according to item [11], may include grouping the plurality of cells into a plurality of groups based on the distance.

Item [13]: The method according to item [11], wherein the assigning the identification value may include: determining, for each cell of the plurality of cells, a number of cells within the plurality of cells that have a same identification value as a corresponding cell; and assigning the identification value to the current cell based on at least the distance and the number of cells within the plurality of cells that have the same identification value.

Item [14]: The method according to item [13], wherein: the current cell and each cell of the plurality of cells may define a plurality of areas; and the assigning the identification value may include: determining, for each cell of the plurality of cells, an amount of overlap between the plurality of areas of a corresponding cell of the plurality of cells and the plurality of areas of the current cell; and assigning the identification value to the current cell based on the distance, the number of cells within the plurality of cells that have the same identification value, and the amount of overlap.

Item [15]: The method according to any one of items to [14], wherein the current cell may define a first distance away from the current cell, and a second distance away from the current cell, wherein the first distance may be greater than the second distance; each cell of the plurality of cells may define a third distance away from a corresponding cell; and the method may include: identifying a first group of cells within the plurality of cells, wherein the first group of cells may include cells that are at a distance away from the current cell that is greater than the first distance; identifying a second group of cells within the plurality of cells, wherein the second group of cells may include cells that are at a distance away from the current cell that is less than the first distance and that is greater than a combination of the second distance and the third distance; identifying a third group of cells within the plurality of cells, wherein the third group of cells may include cells that are at a distance away from the current cell that is less than the first distance and that is less than the combination of the second distance and the third distance; removing cells from the first group of cells, wherein the removed cells from the first group of cells may have an identification value that is a same as an identification value of a cell within the second group of cells or the third group of cells; and removing cells from the second group of cells, wherein the removed cells from the second group of cells may have an identification value that is a same as an identification value of a cell within the third group of cells.

Item [16]: The method according to item [15], wherein the assigning the identification value may include: in response to determining that a number of cells within the first group of cells is at least one, selecting cells within the first group of cells as candidate cells; determining, for each cell of the candidate cells, a number of cells within the plurality of cells that have a same identification value as a corresponding cell of the candidate cells; identifying one of the candidate cells that has a lowest number of cells within the plurality of cells that have the same identification value; and assigning an identification value of the identified one of the candidate cells as the identification value of the current cell.

Item [17]: The method according to item [15], may include: in response to determining that a number of cells within the first group of cells is zero and a number of cells within the second group of cells is at least one, selecting cells within the second group of cells as potential candidate cells; and in response to determining that that the number of cells within the first group of cells and the number of cells within the second group of cells are zero, selecting cells within the third group of cells as the potential candidate cells.

Item [18]: The method according to item [17], wherein: the current cell may define a first area extending in a direction away from the current cell, and a second area surrounding the current cell in a radius; each cell of the potential candidate cells may define a third area surrounding a corresponding cell in a radius, and a fourth area extending in a direction away from a corresponding cell; and the method may include: determining, for each cell of the potential candidate cells, an amount overlap between the first and second areas and the third and fourth areas; identifying cells within the potential candidate cells that has a lowest amount of overlap; selecting one cell within the identified cells that has a greatest distance from the current cell as a first candidate cell; and selecting cells within the potential candidate cells that has a distance from the current cell that is within a first range from the greatest distance and that has an amount of overlap that is within a second range from the lowest amount of overlap as second candidate cells.

Item [19]: The method according to item [18], wherein the assigning the identification value may include: determining, for each cell of the first candidate cell and the second candidate cells, a number of cells within the plurality of cells that have a same identification value as a corresponding cell of the first candidate cell and the second candidate cells; identifying one of the first candidate cell and the second candidate cells that has a lowest number of cells within the plurality of cells that have the same identification value; and assigning an identification value of the identified one of the first candidate cell and the second candidate cells as the identification value of the current cell.

Item [20]: The method according to item [19], wherein: the identification value may include a Physical Cell Identity (PCI); the first distance may define a double of a search radius of the current cell, the second distance may define a collision radius of the current cell, and the third distance may define a collision radius of a corresponding cell of the plurality of cells; when cells within the second group of cells are selected as potential candidate cells: the first area may include a portion of an area defined by the search radius of the current cell, the second area may include an area defined by the collision radius of the current cell, the third area may include an area defined by the collision radius of a corresponding cell of the potential candidate cells; and the fourth area may include a portion of an area defined by a search radius of a corresponding cell of the potential candidate cells; and when cells within the third group of cells are selected as potential candidate cells: the first area may include a portion of an area defined by the collision radius of the current cell, the second area may include an area defined by a half of the collision radius of the current cell, the third area may include an area defined by a half of the collision radius of a corresponding cell of the potential candidate cells; and the fourth area may include a portion of an area defined by the collision radius of a corresponding cell of the potential candidate cells.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:

a memory storage storing computer-executable instructions; and at least one processor communicatively coupled to the memory storage, wherein the at least one processor is configured to execute the instructions to:

determine a distance between a current cell and a plurality of cells; and assign an identification value to the current cell based on at least the distance, by identifying a cell among the plurality of cells based on the determined distance and assigning an identification value of the identified cell as the identification value of the current cell, wherein:

the current cell defines a first distance away from the current cell, and a second distance away from the current cell, wherein the first distance is greater than the second distance;

each cell of the plurality of cells defines a third distance away from a corresponding cell; and the at least one processor is configured to execute the instructions to:

identify a first group of cells within the plurality of cells, wherein the first group of cells comprises cells that are at a distance away from the current cell that is greater than the first distance;

identify a second group of cells within the plurality of cells, wherein the second group of cells comprises cells that are at a distance away from the current cell that is less than the first distance and that is greater than a combination of the second distance and the third distance;

identify a third group of cells within the plurality of cells, wherein the third group of cells comprises cells that are at a distance away from the current cell that is less than the first distance and that is less than the combination of the second distance and the third distance;

remove cells from the first group of cells, wherein the removed cells from the first group of cells have an identification value that is a same as an identification value of a cell within the second group of cells or the third group of cells; and remove cells from the second group of cells, wherein the removed cells from the second group of cells have an identification value that is a same as an identification value of a cell within the third group of cells.

2. The system according to claim 1, wherein the at least one processor is configured to execute the instructions to group the plurality of cells into a plurality of groups based on the distance.

3. The system according to claim 1, wherein the at least one processor is configured to execute the instructions to assign the identification value by:

determining, for each cell of the plurality of cells, a number of cells within the plurality of cells that have a same identification value as a corresponding cell; and assigning the identification value to the current cell based on at least the distance and the number of cells within the plurality of cells that have the same identification value, by identifying the cell among the plurality of cells based on the determined distance and the determined number of cells, and assigning the identification value of the identified cell as the identification value of the current cell.

4. The system according to claim 3, wherein:

the current cell and each cell of the plurality of cells define a plurality of areas; and the at least one processor is configured to execute the instructions to assign the identification value by:

determining, for each cell of the plurality of cells, an amount of overlap between the plurality of areas of a corresponding cell of the plurality of cells and the plurality of areas of the current cell; and assigning the identification value to the current cell based on the distance, the number of cells within the plurality of cells that have the same identification value, and the amount of overlap, by identifying the cell among the plurality of cells based on the determined distance, the determined number of cells and the determined amount of overlap, and assigning the identification value of the identified cell as the identification value of the current cell.

5. The system according to claim 1, wherein the at least one processor is configured to execute the instructions to assign the identification value by:

in response to determining that a number of cells within the first group of cells is at least one, selecting cells within the first group of cells as candidate cells;

determining, for each cell of the candidate cells, a number of cells within the plurality of cells that have a same identification value as a corresponding cell of the candidate cells;

identifying one of the candidate cells that has a lowest number of cells within the plurality of cells that have the same identification value; and assigning an identification value of the identified one of the candidate cells as the identification value of the current cell.

6. The system according to claim 1, wherein the at least one processor is configured to execute the instructions to:

in response to determining that a number of cells within the first group of cells is zero and a number of cells within the second group of cells is at least one, select cells within the second group of cells as potential candidate cells; and in response to determining that that the number of cells within the first group of cells and the number of cells within the second group of cells are zero, select cells within the third group of cells as the potential candidate cells.

7. The system according to claim 6, wherein:

the current cell defines a first area extending in a direction away from the current cell, and a second area surrounding the current cell in a radius;

each cell of the potential candidate cells defines a third area surrounding a corresponding cell in a radius, and a fourth area extending in a direction away from a corresponding cell; and the at least one processor is configured to execute the instructions to:

determine, for each cell of the potential candidate cells, an amount overlap between the first and second areas and the third and fourth areas;

identify cells within the potential candidate cells that has a lowest amount of overlap;

select one cell within the identified cells that has a greatest distance from the current cell as a first candidate cell; and select cells within the potential candidate cells that has a distance from the current cell that is within a first range from the greatest distance and that has an amount of overlap that is within a second range from the lowest amount of overlap as second candidate cells.

8. The system according to claim 7, wherein the at least one processor is configured to execute the instructions to assign the identification value by:

determining, for each cell of the first candidate cell and the second candidate cells, a number of cells within the plurality of cells that have a same identification value as a corresponding cell of the first candidate cell and the second candidate cells;

identifying one of the first candidate cell and the second candidate cells that has a lowest number of cells within the plurality of cells that have the same identification value; and assigning an identification value of the identified one of the first candidate cell and the second candidate cells as the identification value of the current cell.

9. The system according to claim 8, wherein:

the identification value comprises a Physical Cell Identity (PCI);

the first distance defines a double of a search radius of the current cell, the second distance defines a collision radius of the current cell, and the third distance defines a collision radius of a corresponding cell of the plurality of cells;

when cells within the second group of cells are selected as potential candidate cells: the first area comprises a portion of an area defined by the search radius of the current cell, the second area comprises an area defined by the collision radius of the current cell, the third area comprises an area defined by the collision radius of a corresponding cell of the potential candidate cells; and the fourth area comprises a portion of an area defined by a search radius of a corresponding cell of the potential candidate cells; and when cells within the third group of cells are selected as potential candidate cells: the first area comprises a portion of an area defined by the collision radius of the current cell, the second area comprises an area defined by a half of the collision radius of the current cell, the third area comprises an area defined by a half of the collision radius of a corresponding cell of the potential candidate cells; and the fourth area comprises a portion of an area defined by the collision radius of a corresponding cell of the potential candidate cells.

10. A method, comprising:

determining a distance between a current cell and a plurality of cells; and assigning an identification value to the current cell based on at least the distance, by identifying a cell among the plurality of cells based on the determined distance and assigning an identification value of the identified cell as the identification value of the current cell, wherein:

the current cell defines a first distance away from the current cell, and a second distance away from the current cell, wherein the first distance is greater than the second distance;

each cell of the plurality of cells defines a third distance away from a corresponding cell; and the method further comprises:

identifying a first group of cells within the plurality of cells, wherein the first group of cells comprises cells that are at a distance away from the current cell that is greater than the first distance;

identifying a second group of cells within the plurality of cells, wherein the second group of cells comprises cells that are at a distance away from the current cell that is less than the first distance and that is greater than a combination of the second distance and the third distance;

identifying a third group of cells within the plurality of cells, wherein the third group of cells comprises cells that are at a distance away from the current cell that is less than the first distance and that is less than the combination of the second distance and the third distance;

removing cells from the first group of cells, wherein the removed cells from the first group of cells have an identification value that is a same as an identification value of a cell within the second group of cells or the third group of cells; and removing cells from the second group of cells, wherein the removed cells from the second group of cells have an identification value that is a same as an identification value of a cell within the third group of cells.

11. The method according to claim 10, comprising grouping the plurality of cells into a plurality of groups based on the distance.

12. The method according to claim 10, wherein the assigning the identification value comprises:

determining, for each cell of the plurality of cells, a number of cells within the plurality of cells that have a same identification value as a corresponding cell; and assigning the identification value to the current cell based on at least the distance and the number of cells within the plurality of cells that have the same identification value, by identifying the cell among the plurality of cells based on the determined distance and the determined number of cells, and assigning the identification value of the identified cell as the identification value of the current cell.

13. The method according to claim 12, wherein:

the current cell and each cell of the plurality of cells define a plurality of areas; and the assigning the identification value comprises:

determining, for each cell of the plurality of cells, an amount of overlap between the plurality of areas of a corresponding cell of the plurality of cells and the plurality of areas of the current cell; and assigning the identification value to the current cell based on the distance, the number of cells within the plurality of cells that have the same identification value, and the amount of overlap, by identifying the cell among the plurality of cells based on the determined distance, the determined number of cells and the determined amount of overlap, and assigning the identification value of the identified cell as the identification value of the current cell.

14. The method according to claim 10, wherein the assigning the identification value comprises:

in response to determining that a number of cells within the first group of cells is at least one, selecting cells within the first group of cells as candidate cells;

determining, for each cell of the candidate cells, a number of cells within the plurality of cells that have a same identification value as a corresponding cell of the candidate cells;

identifying one of the candidate cells that has a lowest number of cells within the plurality of cells that have the same identification value; and assigning an identification value of the identified one of the candidate cells as the identification value of the current cell.

15. The method according to claim 10, comprising:

in response to determining that a number of cells within the first group of cells is zero and a number of cells within the second group of cells is at least one, selecting cells within the second group of cells as potential candidate cells; and in response to determining that that the number of cells within the first group of cells and the number of cells within the second group of cells are zero, selecting cells within the third group of cells as the potential candidate cells.

16. The method according to claim 15, wherein:

the current cell defines a first area extending in a direction away from the current cell, and a second area surrounding the current cell in a radius;

each cell of the potential candidate cells defines a third area surrounding a corresponding cell in a radius, and a fourth area extending in a direction away from a corresponding cell; and the method comprises:

determining, for each cell of the potential candidate cells, an amount overlap between the first and second areas and the third and fourth areas;

identifying cells within the potential candidate cells that has a lowest amount of overlap;

selecting one cell within the identified cells that has a greatest distance from the current cell as a first candidate cell; and selecting cells within the potential candidate cells that has a distance from the current cell that is within a first range from the greatest distance and that has an amount of overlap that is within a second range from the lowest amount of overlap as second candidate cells.

17. The method according to claim 16, wherein the assigning the identification value comprises:

determining, for each cell of the first candidate cell and the second candidate cells, a number of cells within the plurality of cells that have a same identification value as a corresponding cell of the first candidate cell and the second candidate cells;

identifying one of the first candidate cell and the second candidate cells that has a lowest number of cells within the plurality of cells that have the same identification value; and assigning an identification value of the identified one of the first candidate cell and the second candidate cells as the identification value of the current cell.

18. The method according to claim 17, wherein:

the identification value comprises a Physical Cell Identity (PCI);

the first distance defines a double of a search radius of the current cell, the second distance defines a collision radius of the current cell, and the third distance defines a collision radius of a corresponding cell of the plurality of cells;

when cells within the second group of cells are selected as potential candidate cells: the first area comprises a portion of an area defined by the search radius of the current cell, the second area comprises an area defined by the collision radius of the current cell, the third area comprises an area defined by the collision radius of a corresponding cell of the potential candidate cells; and the fourth area comprises a portion of an area defined by a search radius of a corresponding cell of the potential candidate cells; and when cells within the third group of cells are selected as potential candidate cells: the first area comprises a portion of an area defined by the collision radius of the current cell, the second area comprises an area defined by a half of the collision radius of the current cell, the third area comprises an area defined by a half of the collision radius of a corresponding cell of the potential candidate cells; and the fourth area comprises a portion of an area defined by the collision radius of a corresponding cell of the potential candidate cells.

* * * * *